Patented Dec. 27, 1949

2,492,153

UNITED STATES PATENT OFFICE 2,492,153

PREPARATION OF INSECTICIDAL POLY-PHOSPHATE ESTERS

David C. Hull and Jerry R. Snodgrass, Kingsport, Tenn., assignors to Eastman Kodak Company, Rochester, N. Y., a corporation of New Jersey No Drawing. Application May 10, 1947, Serial No. 747,324

7 Claims. (Cl. 260—461)

1

This invention relates to an improved method for manufacturing certain organic esters of phosphoric acids to produce products exhibiting good insecticidal properties and the compounding and use of such products as insecticides. More particularly this invention concerns an economical and efficient method for the manufacture of various esters of polyphosphoric acids, such as tetraethyl pyrophosphate containing compositions, and other compositions exhibiting insecticidal properties as well as improved methods of compounding and using the aforementioned insecticidal phosphates.

A number of organic phosphates are already known in the prior art. As discussed in our Patent 2,407,279, certain organic phosphates have been prepared which are useful as plasticizers, fire retardants, spinning lubricants, catalyst, and for other purposes. More recently German work has described certain organic phosphates, such as hexaethyl tetraphosphate, which exhibit insecticidal properties when used on aphids, roaches, black and white spiders, and various other lower forms of animal life.

The prior methods which have been described for preparing the aforementioned insecticidal types of phosphates in some instances have required special techniques to obtain a product exhibiting insecticidal strength. Also, in some of the processes suggested for making these compounds a loss in weight is experienced due to the formation of organic chlorides. For example, the preparation of certain hexaesters of tetraphosphoric acid have been described by the reaction of a source of phosphorus, such as the oxychloride of phosphorus, with a neutral ester of phosphoric acid. In other descriptions, products are prepared by the reaction of a neutral ester with a source of phosphorus such as phosphorus pentoxide. In other words, prior to the present invention processes of manufacture have not been very direct in that they have required starting with a synthesized product such as the neutral esters described in our companion Patent 2,407,279, followed by reaction thereof with a source of phosphorus.

In view of the current interest in the above-described type of compound in the insecticidal field, it is apparent that the development of more direct, efficient, and economical methods of preparing insecticidal phosphorus-containing compounds of the class indicated as well as additional types of phosphorus compounds exhibiting insecticidal properties, is a highly desirable result in that such compounds may be made available in the agricultural trade in much larger quantities than are now available and at a more favorable price.

We have found that insecticidal phosphates can be prepared in a direct manner from more basic raw materials than heretofore have been used by procedure involving little or no loss in weight which gives esters of polyphosphoric acids and particularly pyrophosphoric acid exhibiting good insecticidal properties.

This invention has for one object to provide a more direct, efficient, and economical method for manufacturing insecticidal phosphates. Another object is to provide a more direct, efficient, and economical method of preparing in particular the esters of polyphosphoric acids. An object is to provide a direct and efficient method for the manufacture of tetraethyl pyrophosphate. Still another object of our invention is to provide a method of manufacturing products of the type indicated which exhibit satisfactory insecticidal properties. Still another object is to set forth improved methods of compounding and utilizing the insecticidal phosphates produced by the present invention.

Other objects will appear hereinafter.

Not all phosphate products exhibit insecticidal properties. We have observed that in general for an organic phosphate to be a satisfactory insecticide it should comprise a molecularly dehydrated polyphosphate. It should be a polyphosphate which is water soluble. Also, it should have a hydrolysis rate such that the hydrolysis is gradual and essentially complete in around 24 hours in very dilute water solution. We have found that, for example, polyphosphates containing 4 to 10 ethyloxy groups and 2 to 8 phosphorus atoms per molecule, which are water soluble and otherwise possess the properties set forth above in general exhibit good insecticidal properties. We have further found that the insecticidal phosphates of the class just described may be manufactured in a direct and efficient manner from more basic raw materials than those heretofore used by reacting a source of phosphorus, such as phosphorus pentoxide, with an ether such as diethyl ether provided that certain procedure which will be set forth in detail hereinafter is applied, particularly in the isolation of the insecticidal phosphate of the present invention. In addition, as will be described in further detail hereinafter, the aforementioned reaction components may be supplemented by the use of certain meta phosphates as a source of phosphorus and the reaction carried out in a single stage or in several stages. The various polyphosphate esters containing particular ratios of ethyloxy groups to phosphorus atoms referred to above can be obtained in our process by varying such factors as the ratio of the source of phosphorus to the ether, the time of reaction and the like, followed by distilling or otherwise removing in a particular manner to be set forth in detail hereinafter any unreacted or excess ether away from the reaction mass which contains the insecticidal phosphate of the present invention.

In general an insecticidal phosphate of the present invention, exemplified by tetraethyl pyrophosphate, may be directly prepared by reacting a source of phosphorus such as $P_2O_5$, with or without but preferably with some ethyl meta phosphate, with diethyl ether. While smaller molar amounts of ether may be used, in general two or more and preferably four or more of the ether, per molecular weight of the source or sources of phosphorus is used. The reaction is carried out under pressure in a closed reaction vessel, such as an autoclave, at a temperature sufficient to initiate the reaction and preferably between about 100° C. and 180° C. Usually at the higher temperatures (about 100° C.) satisfactory yields of product are obtained in the reaction mass after 8 to 12 hours reaction. However, if lower temperatures and pressures are employed, up to, for example, 24 hours' reaction time may be desirable for obtaining high yields.

In general, the aforementioned reaction under closed conditions will produce an equilibrium reaction mixture containing the desired insecticidal phosphate in the presence of unconsumed ether and other components, since, as discussed above, it is preferred to employ an excess of ether. If this ether is removed from the reaction mass in a manner which does not materially disturb the equilibrium of the reaction components, insecticidal phosphates of the present invention will be isolated in the reaction mass. In general the ether may be removed, for example, by distillation under ordinary atmospheric pressure conditions employing temperatures of heating the base heater containing the reaction materials of not substantially in excess of 110° C.

On the other hand, if subatmospheric distillation is applied, say for example down to below 10 mm., and temperatures of distillation used as described or higher temperatures employed, in addition to the ether being fractionated off as above described, neutral esters of phosphoric acid, such as triethyl phosphate, are removed which esters do not exhibit insecticidal properties. The yield of insecticidal phosphates isolated in the reaction mixture may consequently be diminished. Therefore, in general, in accordance with the present invention in order to isolate the insecticidal phosphate in the reaction mixture it is preferred to distill off the ether under normal atmospheric pressures and in the event subatmospheric pressure is employed not to use below 50 mm. and to employ heating temperatures as measured at the base heater not materially in excess of 110° C.

The insecticidal phosphate (also referred to herein as residue) isolated from ether as above described may be used as an insecticide as obtained in the reaction residue. While the material may be further refined if desired, this adds to the cost and we have found that our residue whether in the form of a dust, emulsion or solution satisfactorily functions as an insecticide. That is, in the form of a solution or emulsion concentrations of 1% or less exhibit satisfactory insecticidal properties. Higher concentrations may be used but there is little advantage in employing amounts outside of the range of .1% to 1.0%. In the form of a dust, concentrations between .5% and 10% have been found to be practical. For example, a dust of ½% concentration when tested on German roaches gave an 80% kill in fifteen minutes and at the end of one hour a 100% kill was obtained. In making dust using our insecticide material any material may be used as a carrier, such as talcum, starch, sulfur, and the like. Our insecticide residue in accordance with the present invention is applicable to the extermination of various types of insects and even rodents, some of which are resistant to the effects of insecticides currently used. Further details along the line of the formulation and use of our residue as an insecticide will be set forth hereinafter.

While it is not desired to be bound by any theories concerning the mechanism of the chemical reaction in our process, the following general formulations may comprise an explanation of some of the mechanism of our process and aid in the understanding of our invention. As is well known, phosphorus is capable of existing in various different valence states, and it is probable that in our reaction a number of separate and competing reactions may take place which may be directed to some extent by the choice of temperatures, mol ratios, and the like. Under various temperature and pressure conditions the several reactions formulated may take place, considering for example the situation where diethyl ether and phosphorus pentoxide comprise the principal raw materials fed to the process.

(A) $3C_2H_5OC_2H_5 + P_2O_5 \longrightarrow 2(C_2H_5O)_3PO$ (Triethyl phosphate)

(B) $P_2O_5 + 4(C_2H_5O)_3PO \longrightarrow 3(C_2H_5)_4P_2O_7$ (Tetraethyl pyrophosphate)

(C) $6(C_2H_5)_4P_2O_7 \xrightarrow[\text{Reduced pressure}]{\text{Heat}} 6(C_2H_5O)_3PO + 3(C_2H_5)_2P_2O_6$ (ethyl metaphosphate)

(D) $3C_2H_5OC_2H_5 + (C_2H_5)_2P_2O_6 \longrightarrow (C_2H_5)_4P_2O_7$ (E) $P_2O_5 + 2(C_2H_5)_2O \longrightarrow$ Hexaethyl tetraphosphate (F) $P_2O_5 + 4(C_2H_5)_2O \longrightarrow$ Tetraethyl pyrophosphate (G) $\tfrac{1}{2}P_2O_5 + \tfrac{1}{2}$ diethyl metaphosphate $+ 3\tfrac{1}{2}$ diethyl ether $\longrightarrow$ Tetraethyl pyrophosphate The above are merely some of the more prominent reactions which may take place depending on conditions of molar concentrations of ether, conditions of pressure, etc. There may also be formed or otherwise present diethyl phosphoric acid, metaphosphoric acid, and the like, all of which reaction products are in the presence of ether, particularly if excess ether has been used at the start as set forth above. Along this line, it will be noted that, for example, the utilization of 2 moles of ether may favor the formation of hexaesters, whereas the use of 4 moles or more may favor the formation of tetraethyl pyrophosphate. Likewise, the presence of substantial amounts of ethyl metaphosphate, either by leaving in the reaction apparatus residue from a preceding reaction or by specifically incorporating ethyl metaphosphate in a new reaction mixture, that the formation of tetraethyl pyrophosphate may be promoted.

Therefore, for the purposes of the present description, considering tetraethyl pyrophosphate to be the insecticidal residue desired from the reaction, the reaction may be expedited in the desired direction by the control of the amounts of ether added, conducting the reaction for about 8 to 12 hours for favoring equilibrium conditions which bring about a large amount of the tetraethyl pyrophosphate, and the like steps. However, it will be further observed that even though a large content of tetraethyl pyrophosphate is formed in the reaction mixture, this insecticidal compound can be lost by high heating and/or the application of too large a degree of reduced pressure as shown by reaction (C) above. Therefore, in accordance with the present invention the tetraethyl pyrophosphate is preferably isolated in the residue by stripping off the unreacted ether, say at a temperature not exceeding about 110° C. and under normal atmospheric pressure conditions, although as discussed above some reduced pressure may be applied without causing substantial transformation of tetraethyl pyrophosphate to the neutral esters of phosphoric acid which pure neutral esters have little or no insecticidal value.

A still further understanding of our invention may be had by consideration of the specific examples which follow: It is to be understood that these examples are for the purpose of illustrating specific embodiments of our invention and are not to be construed as an undue limitation upon the scope of the present invention.

Example 1

1420 parts of $P_2O_5$ were mixed with 2860 parts of diethyl ether, and the mixture was autoclaved at 160° C. for eight hours. The excess ether was flashed off with due care and condensed and the remaining polyethyl polyphosphate consisting largely of insecticidal tetraethyl pyrophosphate was tested for insecticidal strength. With German roaches a dust containing 5% of this material gave a complete kill within thirty minutes.

Example 2

216 parts of ethyl metaphosphate were mixed with 142 parts of $P_2O_5$ at 40–60° C. The mixture was autoclaved at 160°–172° C. with 600 parts of diethyl ether for 12 hours. Excess and/or unreacted ether was removed by distillation without exceeding 105° C. in the base heater. The remaining polyethyl polyphosphate consisting largely of tetraethyl pyrophosphate was tested for insecticidal strength as a 0.1% solution in water. The spray gave a complete kill of aphids and tree lice in three hours.

Example 3

1420 parts of $P_2O_5$ were mixed with 5000 parts of diethyl ether, and the mixture was autoclaved at 160° C. for 16 hours. The excess ether was removed by distillation with due care and condensed and the remaining polyethyl polyphosphate was found to have good insecticidal strength.

In the above examples the preferred operation was carried out. That is, as described the unreacted ether was stripped off at temperatures below 110° C. and under a little or no reduced pressure. In the examples which follow some reduced pressure was utilized which more completely removed the ether fraction but at the same time phosphates were also removed thereby reducing the overall yield of insecticide. The phosphates so removed have value or can be converted into insecticides by returning them to the process.

Example 4

1420 parts of $P_2O_5$ were mixed with 2960 parts of diethyl ether, and the mixture was autoclaved at 160° C. for eight hours. The excess ether present was flashed off and condensed, and the remaining mixture was distilled under reduced pressure to remove triethyl phosphate. The distillation was continued until the base heater had reached a temperature of 160° C. About 1180 parts of insecticidal tetraethyl pyrophosphate residue were obtained having good insecticidal properties.

Example 5

In accordance with this example the reactor was charged with materials in the following approximate ratios: ½ mole of phosphorus pentoxide, ½ mole of ethyl metaphosphate, and 3½ moles of diethyl ether. As in the examples already described, the reaction was maintained at a temperature in excess of 100° C. but below 180° C. for approximately 12 hours. At the conclusion of the reaction period the ether was vented under atmospheric pressure conditions and at a temperature of approximately 100° C. It was found that the insecticidal phosphate residue isolated in this example contained tetraethyl pyrophosphate in a very high yield. Apparently, the presence of the ethyl metaphosphate even in a small molar ratio facilitated the reaction.

Still further examples were carried out varying the proportions and technique of reaction. It was observed from these further examples that excellent results could be obtained, along the lines of Example 2 by reacting the source of phosphorus ($P_2O_5$) first with the ethyl metaphosphate and then after a short period of preliminary reaction the ether was incorporated. This two-stage reaction gave high yields of an insecticidal residue of excellent quality.

The residue which is obtained may be employed whether in the form of a dust, an emulsion, or a solution. In the form of a spray it is desirable to employ this insecticidal material in aqueous solutions containing 0.1% or less of the insecticide. Higher concentrations may be used, but there is little or no advantage in using more than 0.1% thereof. In the form of a dust concentrations up to 5% have been found to be practical. As an example of the effectiveness of insecticidal tetraethyl pyrophosphate residue, such as prepared herein, its killing power in the form of a dust of ½% concenration was tested using German roaches. An 80% kill was obtained in fifteen minutes, and at the end of one hour a 100% kill was obtained. For dusts using this insecticide any inert material may be used as the carrier, such as talcum, starch, or the like. The insecticide in accordance with our invention is applicable to the extermination of various types of insects, some of which are resistant to the effects of insecticides currently used. For instance, our insecticide is useful for the extermination of aphids and mites which feed on foliage and are commonly found in orchards and vegetable and flower gardens. Our insecticide is further valuable in that it does not harm the foliage, fruit, or bud of the common domestic plants to which it would be applied.

Our process is particularly valuable from the practical aspect in that it not only provides a method for preparing a satisfactory insecticide material but that it permits the production of such insecticides from more basic, readily available starting materials, namely, alkyl ethers, and a source of phosphorus such as phosphorus pentoxide or by-product phosphates such as ethyl metaphosphate. While our process may be conducted in a single direct reaction, as already illustrated, it may be conducted in two or more stages. Other variations will be apparent.

We claim:

1. The method of preparing water-soluble polyphosphates containing 4 to 10 ethyloxy groups and 2 to 8 phosphorus atoms per molecule which comprises reacting not less than 2 mole parts of diethyl ether with 1 mole part of phosphorus pentoxide, said reaction being conducted under autogenic pressure at temperatures up to 180° C. for a suitable period of time between 8 and 24 hours to produce a reaction mixture containing a substantial amount of said polyphosphate in the presence of some diethyl ether and isolating insecticidal polyphosphate by distilling off at least a substantial part of the ether under pressure conditions not below 50 mm. and at distillation temperatures not substantially in excess of 110° C.

2. The method of preparing water soluble polyphosphates containing 4 to 10 ethyloxy groups and 2 to 8 phosphorus atoms per molecule that exhibit insecticidal properties which comprises reacting not less than 2 mole parts of diethyl ether with 1 mole part of a source of phosphorus selected from the group consisting of phosphorus pentoxide and ethyl metaphosphate, said reaction being reacted under autogenic pressure at temperatures up to 180° C. for a suitable period of time to produce a reaction mixture containing a substantial amount of said polyphosphate in the presence of some diethyl ether and isolating insecticidal polyphosphate by distilling off a substantial part of ether under pressure conditions not below 50 mm. and at distillation temperatures not substantially in excess of 110° C.

3. The method of preparing water-soluble polyphosphates containing 4 to 10 ethyloxy groups and 2 to 8 phosphorus atoms per molecule that exhibit insecticidal properties which comprises reacting not less than 2 mole parts of diethyl ether with 1 mole part of a source of phosphorus selected from the group consisting of phosphorus pentoxide and ethyl metaphosphate, said reaction being reacted under autogenic pressure at temperatures between 140° to 180° C. for a suitable period of time between 8 and 24 hours to produce a reaction mixture containing the polyphosphate in the presence of some diethyl ether and isolating insecticidal polyphosphate by distilling off a substantial amount of ether under ordinary atmospheric pressure conditions and at distillation temperatures not substantially in excess of 110° C.

4. The process of preparing tetraethyl pyrophosphate which comprises reacting together several mole parts of diethyl ether per mole part of phosphorus pentoxide, conducting said reaction under autogenic pressure at a temperature up to 180° C. for a suitable period of time whereby a substantial amount of tetraethyl pyrophosphate forms in the reaction mass in the presence of some diethyl ether and isolating said insecticidal tetraethyl pyrophosphate as a residue by distilling off at least a substantial amount of said ether under pressure and temperature conditions of not below 50 mm. and not above 110° C.

5. The process of preparing tetraethyl pyrophosphate which comprises reacting together at least 4 mole parts of diethyl ether per mole part of phosphorus pentoxide, conducting the reaction under autogenic pressure at a temperature between 140° C. and 180° C. for a suitable period of time between 8 and 14 hours whereby a substantial amount of tetraethyl pyrophosphate forms in the reaction mass in the presence of some diethyl ether and isolating said insecticidal tetraethyl pyrophosphate as a residue by distilling off at least a substantial amount of said ether under atmospheric pressure conditions and at temperature conditions not above 110° C.

6. The process of producing insecticidal organic phosphates which comprises reacting a plurality of mole parts of diethyl ether with not greater than 1 mole part of each of phosphorus pentoxide and ethyl metaphosphate, conducting the reaction under autogenic pressure at a temperature not in excess of 180° C. for a suitable period of time between 8 and 24 hours whereby a substantial amount of the insecticidal phosphate is formed in the reaction mixture in the presence of diethyl ether, separating a substantial amount of this diethyl ether from the reaction mixture by distillation under pressure conditions not below 50 mm. and at a temperature not in excess of 110° C. whereby a residue is obtained which exhibits active insecticidal properties.

7. The process of producing organic phosphates useful as insecticides which comprises reacting phosphorus pentoxide and ethyl metaphosphate, incorporating a substantial amount of diethyl ether and reacting further, conducting the reactions under autogenic pressure at a temperature not in excess of 180° C. whereby a substantial amount of the insecticidal phosphate is formed in the reaction mixture in the presence of diethyl ether and separating at least a part of diethyl ether from the reaction mixture by distillation under pressure conditions not substantially below atmospheric and at a temperature not in excess of 110° C. whereby the residue resulting exhibits active insecticidal properties.

DAVID C. HULL.
JERRY R. SNODGRASS.

REFERENCES CITED

The following references are of record in the file of this patent:

UNITED STATES PATENTS

| Number | Name | Date |
| --- | --- | --- |
| 2,402,703 | Woodstock | June 25, 1946 |
| 2,407,279 | Hull et al. | Sept. 10, 1946 |

FOREIGN PATENTS

| Number | Country | Date |
| --- | --- | --- |
| 242,613 | Germany | Jan. 13, 1912 |

OTHER REFERENCES

Balarew, "Zeit. Anorg. Chem.," vol. 99 (1917), page 191.

Kilgore, Soap and Sanitary Chemicals, Dec. 1945, pages 138, 171.

Certificate of Correction

Patent No. 2,492,153  December 27, 1949

DAVID C. HULL ET AL.

It is hereby certified that errors appear in the printed specification of the above numbered patent requiring correction as follows:

Column 3, line 26, for "(about 100° C.)" read *(above 100° C.)*; column 5, line 31 for "2860 parts" read *2960 parts*;

and that the said Letters Patent should be read with these corrections therein that the same may conform to the record of the case in the Patent Office.

Signed and sealed this 18th day of April, A. D. 1950.

[SEAL]

THOMAS F. MURPHY,
*Assistant Commissioner of Patents.*